(12) United States Patent
Nikola et al.

(10) Patent No.: US 11,836,884 B2
(45) Date of Patent: *Dec. 5, 2023

(54) REAL-TIME GENERATION OF FUNCTIONAL ROAD MAPS

(71) Applicant: IMAGRY (ISRAEL) LTD, Haifa (IL)

(72) Inventors: Nikolai Nikola, Haifa (IL); Adham Ghazali, Haifa (IL); Ariel Keselman, Kiryat Tiv'on (IL)

(73) Assignee: IMAGRY (ISRAEL) LTD, Haifa (IL)

( * ) Notice: Subject to any disclaimer, the term of this patent is extended or adjusted under 35 U.S.C. 154(b) by 90 days.

This patent is subject to a terminal disclaimer.

(21) Appl. No.: 17/523,206

(22) Filed: Nov. 10, 2021

(65) Prior Publication Data
US 2022/0067877 A1 Mar. 3, 2022

Related U.S. Application Data

(63) Continuation of application No. 16/701,622, filed on Dec. 3, 2019, now Pat. No. 11,189,007.

(51) Int. Cl.
*G01S 17/06* (2006.01)
*G06T 3/00* (2006.01)
(Continued)

(52) U.S. Cl.
CPC ............ *G06T 3/00* (2013.01); *G01C 21/3811* (2020.08); *G01C 21/3822* (2020.08);
(Continued)

(58) Field of Classification Search
CPC .. G05D 1/0088; G05D 1/0038; B64C 39/024; H04N 19/27; G01S 13/865; G01S 17/06; H04L 65/80; B60W 30/12; B60W 50/0098; A47L 9/2894; G06K 9/00791; G06N 3/088; G01C 21/3837; G01C 21/00; G05B 13/027
See application file for complete search history.

(56) References Cited

U.S. PATENT DOCUMENTS 9,151,626 B1 * 10/2015 Kojo ..................... B60W 30/12
10,510,158 B1 * 12/2019 Kamon ................. B64C 39/024
(Continued)

FOREIGN PATENT DOCUMENTS

JP          H09189561 A   *  7/1997  ............. G01C 21/00

*Primary Examiner* — Yuri Kan

(57) ABSTRACT

A method, an apparatus and a computer program for real-time generation of functional road maps. The method comprises obtaining a real-time input from a sensor mounted on a vehicle, that captures a front view of a road ahead of the vehicle and processing thereof by a neural network to generate a functional map of the road ahead of the vehicle. Each pixel in the functional map is associated with a predetermined relative position to the vehicle. A content of each pixel is assigned a set of values, each of which represents a functional feature relating to a location at a corresponding predetermined relative position to the pixel. The processing is performed without relying on a predetermined precise mapping. The method further comprises providing the functional map to an autonomous navigation system of the vehicle, to autonomously drive the vehicle in accordance with functional features represented by the functional map.

10 Claims, 9 Drawing Sheets

(51) Int. Cl.
    *G05B 13/02*       (2006.01)
    *G01C 21/00*       (2006.01)
    *G06N 3/088*       (2023.01)
    *G06N 3/04*        (2023.01)
    *G06V 20/56*       (2022.01)
    *G06N 3/045*       (2023.01)
    *G06N 3/08*        (2023.01)
    *G06N 3/047*       (2023.01)

(52) U.S. Cl.
    CPC ....... *G01C 21/3837* (2020.08); *G05B 13/027* (2013.01); *G06N 3/04* (2013.01); *G06N 3/045* (2023.01); *G06N 3/088* (2013.01); *G06V 20/56* (2022.01); *G06V 20/588* (2022.01); *G06N 3/047* (2023.01); *G06N 3/08* (2013.01)

(56) References Cited

U.S. PATENT DOCUMENTS

| | | | | |
|---|---|---|---|---|
| 10,984,290 | B1* | 4/2021 | Goel | G05D 1/0038 |
| 11,189,007 | B2* | 11/2021 | Nikola | G05B 13/027 |
| 11,474,529 | B2* | 10/2022 | Keselman | B60W 50/0098 |
| 2016/0073117 | A1* | 3/2016 | Grasmug | H04N 19/27 |
| | | | | 375/240.26 |
| 2017/0329347 | A1* | 11/2017 | Passot | G05D 1/0088 |
| 2018/0202814 | A1* | 7/2018 | Kudrynski | G01S 13/865 |
| 2019/0226853 | A1* | 7/2019 | Kubiak | G01S 17/06 |
| 2019/0253475 | A1* | 8/2019 | Bhattacharyya | H04L 65/80 |
| 2021/0089040 | A1* | 3/2021 | Ebrahimi Afrouzi | ............ |
| | | | | A47L 9/2894 |
| 2021/0166340 | A1* | 6/2021 | Nikola | G01C 21/3837 |

* cited by examiner

REAL-TIME GENERATION OF FUNCTIONAL ROAD MAPS

TECHNICAL FIELD

The present disclosure relates to maps generation for autonomous and semi-autonomous driving in general, and to real-time generation of functional road maps, in particular.

BACKGROUND

The technology of autonomous vehicles is moving forward globally in a progression of scaled technology, and may be a significant part of the future of the automotive industry. Autonomous vehicles combine a variety of sensors to perceive their surroundings, such as radar, LiDar, sonar, GPS, odometry, inertial measurement units, or the like. Advanced control systems interpret sensory information to identify appropriate navigation paths, obstacles and relevant signage, to help the vehicle control the self-driving.

As highly automated driving and autonomous vehicles further develop, there is a need to develop and improve such systems, including the vehicle navigation system, the location system, the map matching, the environment perception, or the like. The challenge for autonomous vehicles designers is to produce control systems capable of analyzing sensory data in order to provide accurate detection of other vehicles and the road ahead.

BRIEF SUMMARY

One exemplary embodiment of the disclosed subject matter is a method comprising: obtaining a real-time visual input from a sensor mounted on a vehicle. The real-time visual input may capture a front view of a road ahead of the vehicle. The method further comprises processing the real-time input by a neural network to generate a functional top-down map of the road ahead of the vehicle. Each pixel in the functional top-down map may be associated with a predetermined relative position to the vehicle. A content of each pixel in the functional top-down map may be assigned a set of values, each of which may represent a functional feature relating to a location at a corresponding predetermined relative position to the pixel. The processing may be performed without relying on a pre-determined precise mapping. The method further comprises providing the functional top-down map to an autonomous navigation system of the vehicle, whereby the autonomous navigation system autonomously drives the vehicle in accordance with functional features represented by the functional top-down map.

Optionally, the neural network may comprise an encoder-decoder architecture. The encoder-decoder architecture may comprise an encoder section having one or more encoding layers, a latent vector layer, and a decoder section having one or more decoding layers. The encoder section may be configured to receive as input the real-time visual input providing a visual front view representation of a scene. The decoder section may be configured to output the functional top-down map. The encoder-decoder architecture may simultaneously transform visual information to functional information and changing a point of view of the scene.

Optionally, the encoder section may comprise a fully convolutional network. The fully convolutional network may be configured to transform the real-time visual input into a scaled down feature layer. The encoder section may be configured to map the scaled down feature layer into the latent vector layer.

Optionally, the encoder section may be absent a perspective transformation layer for changing an image of the scene from the front view to an alternative image of a top-down view.

Optionally, wherein an input of the encoder section may have a different size than an output of the decoder section.

Optionally, the latent vector layer may comprise no more than about 1024 nodes.

Optionally, the latent vector layer c may comprise no more than about 64 nodes.

Optionally, the set of values assigned to each pixel in the functional top-down map may comprise at least two of: a drivable road indication; an available driving path indication; a stop line indication; a speed bump indication; and a lane markings indication. The functional top-down map may be configured to provide functional information useful for the autonomous navigation system to perform autonomous driving.

Optionally, the vehicle may comprise a location module providing location information of the vehicle. Processing the real-time input may be performed without relying on the location information of the vehicle.

Optionally, the real-time visual input further may capture a back view behind the vehicle, and two side views at a left side and at a right side of the vehicle.

Another exemplary embodiment of the disclosed subject matter is a computerized apparatus having a processor, the processor being adapted to perform the steps of: obtaining a real-time visual input from a sensor mounted on a vehicle, wherein the real-time visual input captures a front view of a road ahead of the vehicle. The processor may be further adapted to perform processing the real-time input by a neural network to generate a functional top-down map of the road ahead of the vehicle. Each pixel in the functional top-down map may be associated with a predetermined relative position to the vehicle. A content of each pixel in the functional top-down map may be assigned a set of values, each of which may represent a functional feature relating to a location at a corresponding predetermined relative position to the pixel. The processing may be performed without relying on a pre-determined precise mapping. The processor may be further adapted to provide the functional top-down map to an autonomous navigation system of the vehicle, whereby the autonomous navigation system autonomously drives the vehicle in accordance with functional features represented by so the functional top-down map.

Yet another exemplary embodiment of the disclosed subject matter is a computer program product comprising a non-transitory computer readable storage medium retaining program instructions, which program instructions when read by a processor, cause the processor to perform a method comprising: obtaining a real-time visual input from a sensor mounted on a vehicle. The real-time visual input may capture a front view of a road ahead of the vehicle. The method further comprises processing the real-time input by a neural network to generate a functional top-down map of the road ahead of the vehicle. Each pixel in the functional top-down map may be associated with a predetermined relative position to the vehicle. A content of each pixel in the functional top-down map may be assigned a set of values, each of which may represent a functional feature relating to a location at a corresponding predetermined relative position to the pixel. The processing may be performed without relying on a pre-determined precise mapping. The method further comprises providing the functional top-down map to an autonomous navigation system of the vehicle, whereby the autonomous navigation system autonomously drives the vehicle in accordance with functional features represented by the functional top-down map.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
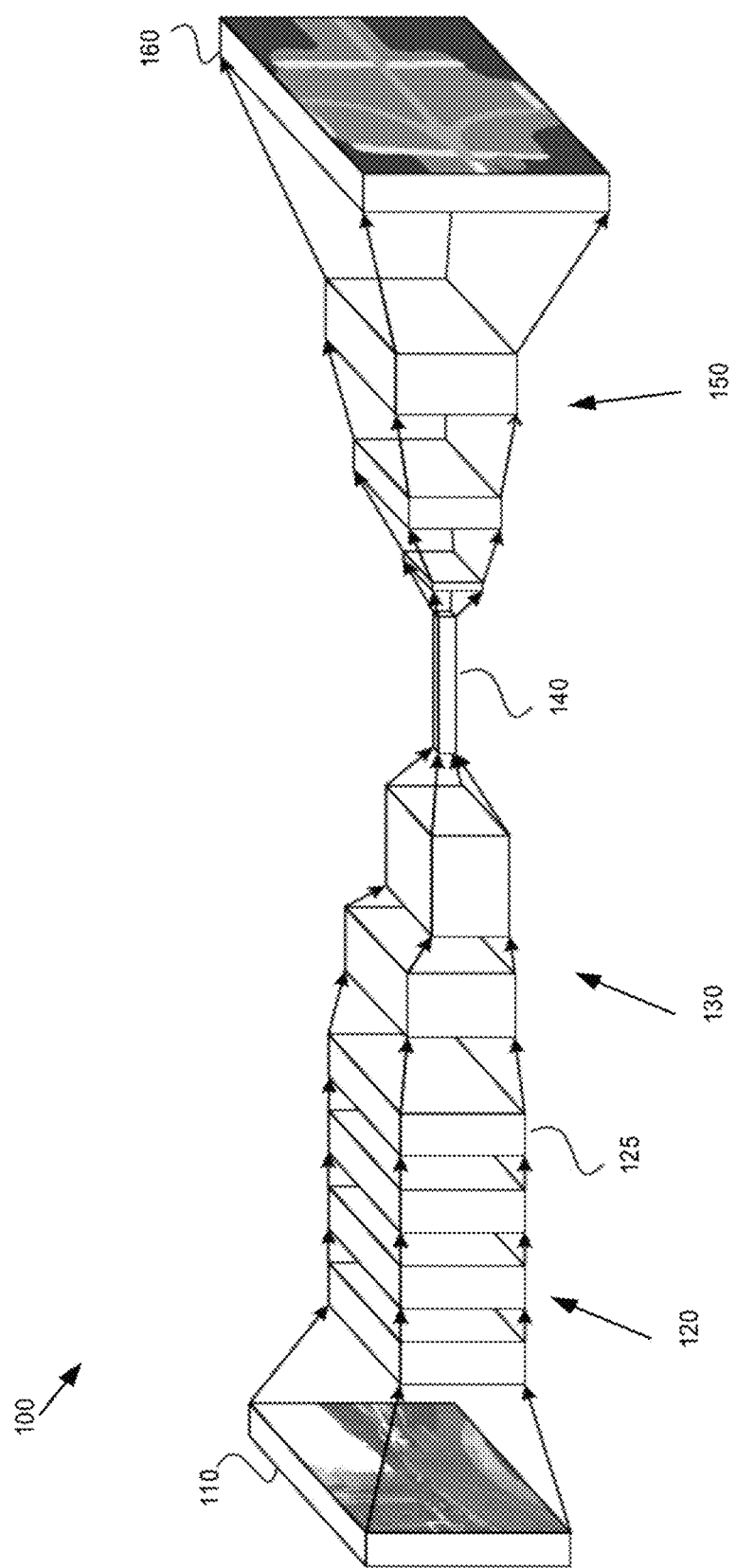
FIG. 1 shows a schematic illustration of an exemplary neural network, in accordance with some exemplary embodiments of the disclosed subject matter.

One technical problem dealt with by the disclosed subject matter is to enable self-navigation of autonomous vehicles, in the absence of maps, Global Positioning System (GPS) connection or other geo-spatial positioning systems. A mapless autonomous driving platform, that does not rely on existing high-precision maps, may be required.

In some exemplary embodiments, autonomous vehicles may be fully operated using High-Definition (HD) mapping. HD mapping may require a strong connection to satellite GPS and continuous effort to update the maps. In some exemplary embodiments, an HD map may be maintained manually. Such map may indicate in high resolution information such as lanes, stop lines, bumpers, or the like. As opposed to regular road maps, which may be obtained using crowd-sourced information, currently HD mapping is not available using such source. Instead, extensive manual effort may be invested into creating an HD mapping of an area in which an autonomous vehicle may drive.

In some exemplary embodiments, a mapless autonomous driving platform may eliminate the need for the costly and time-consuming technology of HD mapping.

It is further noted that HD mapping may be utilized in non-autonomous driving scenarios. For example, in a semi-autonomous driving platform, the platform may provide alerts to the human driver, based on her activity and in view of an HD mapping of the surroundings of the vehicle. However, for the ease of explanation and for clarity purposes, and without limiting the disclosed subject matter to such embodiment, the description is focused on the autonomous driving embodiment.

One technical solution is to generate functional road maps using real-time visual input, captured by sensors mounted on the vehicles. In some exemplary embodiments, one or more images from one or more cameras mounted on the front of the vehicle may be utilized as real-time visual input. Additionally or alternatively, additional sensor information, such as obtained from LiDAR, odometry, inertial measurement units, or the like, may be utilized. In some exemplary embodiments, the functional road maps may comprise precise real-time information and true-ground-absolute accuracy. In some exemplary embodiments, the functional road maps may be HD maps that are generated on the fly and based on sensor input only. In some exemplary embodiments, the functional road maps may be of higher resolution than maps found in current conventional resources, such as crowd-based road maps. The functional road maps may be utilized by the navigation system of autonomous vehicles. In some exemplary embodiments, the on-the-fly generated functional road maps may be utilized instead of the pre-prepared HD maps that can be correlated with the present environment of the vehicle based on location information, such as obtained using a GPS connection.

In some exemplary embodiments, the functional road maps may be vehicle-centered. The vehicle may be determined to be at a fixed location and orientation within the map. Additionally or alternatively, the functional road maps format may be functional. Each functional road map may comprise only the necessary information for a vehicle to safely navigate its environment. As an example, the information may comprise information required for lane determination, identification of a location to stop the vehicle, or the like. Additional information, such as relating to buildings that are sensed by the sensors, may be absent from the functional road map.

In some exemplary embodiments, the functional road maps may be generated utilizing an Artificial Neural Network (ANN). In some exemplary embodiments, the ANN may be trained to detect road features and transform the input image space into a top view space in a single shot. The ANN may be configured to process the one or more images and generate a top-down functional road map. The top-down functional road map may comprise for each pixel one or more features that are relevant to assisting the autonomous navigation of the vehicle within the map. Such element and features may comprise vehicles or portions thereof, obstacles, moving elements, pedestrians, pedestrian crossings, or the like.

In some exemplary embodiments, the ANN may be built using an Encoder-Decoder architecture. The ANN may comprise an encoder element, connected to a latent vector, that is connected to a decoder element. The encoder element of the network may comprise multiple convolutional layers that may be configured to process the visual input and compress it into a single latent vector. The size of the single latent vector may be varied. In some exemplary embodiments, the size of the single latent vector may not exceed 1024 nodes in the most extreme case. Additionally or alternatively, a size of about 64 nodes may be useful in most practical applications. After this compression, the latent vector may be passed through the decoder element of the network, which may be configured to expand the vector into a functional top-down map of the road ahead of the vehicle.

In some exemplary embodiments, all the necessary information that is required for generating the functional top-down map, may be encoded into the latent vector. Such setup may force the network to distill the abundance of information available into only the parts most relevant to interpreting the scene into a top-down map. By limiting the amount of information in the encoded representation, the networks ability to memorize specific cases may be limited. Instead, the ANN may be forced to logically interpret the scene, in order to provide a correct output. The variance of the network's output may likewise be limited to logical perceivable elements on the road.

The disclosed architecture may transform the visual input, e.g., the forward image, into top-down map of the road ahead, which may be of a different size and shape than the input. This is as opposed to the use of encoder-decoder architecture for re-constructing an image of the same size and proportions. In some exemplary embodiments, autoencoder networks may be used to replicate an input image after its compression, by mapping the input into a latent vector using the encoder and mapping the latent vector to a reconstruction of the original input using the decoder, which are of the same size and shape as the original input. In some exemplary embodiments, the output in the present disclosed subject matter may not be a mere modification or replication of the input. Instead, the output may be a substantial transformation from one point of view, from the car facing forward, to a completely different one, a top-down birds-eye view of the road ahead, and represented in a functional manner using functional features relevant to assisting the autonomous navigation of the vehicle within the map.

It may be noted that the task of transforming a forward view of a scene into a completely different representation, which is not a pixel-wise transformation of the original input, such as a top-down view of the scene in a functional format, is a complicated task that may be costly and time-consuming using general network architecture, and may even be not feasible. It is noted that two separate networks (or concatenated layers) may be used to first transform the front-view to a top-down image of the scene, and then transform the top-down image into a top-down functional road map. However, during such separate computations, important information may be lost, and the intermediate output may be too noisy to be sufficiently accurate.

As an example, consider a naïve implementation where a first ANN performs a pure perspective transformation of a front view image to a top-down image; such may end up with a noisy, smeared, and mostly useless image, as the information in a front view image may not be sufficient to fully reconstruct the scene in top-down view. Given such noisy image, a functional map that is constructed based thereon may be imprecise and insufficient for safely driving autonomous vehicles.

In some exemplary embodiments, the ANN may be configured to learn to interpret the data as a global structure instead of a localized, pixel by pixel fashion, in order to be transformed to a different perspective and to a different modality. The ANN may be configured to extract long-range correlations, large-scale features, or the like, that may be necessary for the task of constructing the top-down functional map. The ANN may comprise several elements that may enable to extract such features. These elements may comprise different types of self-attention modules, that may be configured to capture long-range interactions. The process of self-attention modules may comprise reweighting different pixels, channels, or the like, to focus the following layers' attention on layers with higher weights, while paying less heed to layers with lower weights. Self-attention modules may be employed within the backbone of the ANN, such as within a portion of its constituent residual blocks. The number and type of employed self-attention modules, the blocks they are employed in, or the like, may be changed from one iteration of the model to another. Such modules may give the ANN stronger tools to work with than the standard convolutions, which are local in nature, having no information regarding the relative position of each pixel processed, and can generally extract small scale features.

As an example, the self-attention modules may be a Convolutional Block Attention Module (CBAM). CBAM may be configured to allow the ANN to efficiently calculate spatial and channel-wise attention. Given an input tensor of dimensions C×H×W, with C being designated the number of channels, with H and W being the height and width of the channels, respectively, CBAM may be configured to calculate channel-wise attention by reducing the tensor to a C×1×1 shape. CBAM may utilize a fully connected layer to calculate the C weights. Each C weight may be a number for a layer, by which the original input tensor is reweighted. Each layer may be multiplied by its respective C weight. The spatial attention may be similarly obtained by reducing the input along the channels dimension, to a 1×H×W tensor. A 3×3 convolution, a 7×7 convolution, or the like, may be applied to produce a 1×H×W tensor of weights to be multiplied by the original C×H×W input. Each C×1×1 column in the input may be multiplied by the respective weight. As another example, a Self-Attention Generative Adversarial Network (SA) that comprises self-attention module may be trained. SA may comprise a computationally heavier module than CBAM. Given an input tensor of dimensions C×H×W where N=H*W, SA may be configured to explicitly calculate N^2 numbers defining the extent to which the next feature layer value at each pixel takes into account the value at each other pixel. SA may be configured to allow the ANN to glean large scale structures and long-range correlations, instead of the local nature of standard convolutions. The attention element in SA may be more general than in the CBAM module, as it considers the attention paid each pixel by each other pixel, in addition to a more general locally calculated pixel-wise reweighting. SA may be optionally employed at the end of the encoder and towards the end of the decoder, operating on feature layers with small to moderate spatial dimensions.

Additionally or alternatively, the ANN may comprise a modified version of a standard convolutional layer. Such modules may give the ANN stronger tools to work with than the standard convolutions, which are local in nature, having no information regarding the relative position of each pixel processed, and can generally extract only small scale features. As an example, the ANN may comprise one or more CoordConv layers. Standard convolutional layers may be by default blind to the relative location of each feature within the layer, as they may consist of a rectangular kernel applied across the layer. CoordConv provides a modification that takes into account the relative location, such as the feature being in the center of the layer, the right edge, the left edge, or the like. CoordConv works by giving the convolution access to its own input coordinates through the use of extra coordinate channels. Without sacrificing the computational and parametric efficiency of ordinary convolution, Coord-Conv may allow the ANN to learn either complete translation invariance or varying degrees of translation dependence, as required by the end task. The coordConv modification may concatenate two extra layers to the input tensor containing the x and y coordinates of each pixel, normalized between −1 and 1. The convolutional kernel may then take on an additional two layers. This may allow the convolutional layer weights to potentially learn features which depend on the relative spatial location within the input tensor. As an example, the ANN may comprise one or more layers normalized with Spectral Normalization. The Spectral Normalization may be applied on the weights of a convolutional layer, such that the output is Lipschitz continuous. Spectral Normalization may be configured to stabilize the training procedure and produce more robust and consistent outputs. Spectral Normalization may be employed within the decoder part of the ANN.

One technical effect of utilizing the disclosed subject matter is providing a highly intelligent, vision-based approach that does not require a-priori HD mapping. In some exemplary embodiments, the on-the-fly generation of the top-down functional road map may allow the market for autonomous vehicles to scale and commercialize more rapidly at less cost.

Another technical effect of utilizing the disclosed subject matter is to enable autonomous vehicles to automatically navigate without the need of GPS connection. As the map generation utilizes real-time input from sensors mounted on the vehicle and does not rely on GPS localization within pre-fabricated global maps, maps may be generated in any location, in spite of the vehicle not being connected to GPS, the location yet not being mapped, or the like.

In some exemplary embodiments, GPS location may be utilized to augment the information available for the generation of the top-down functional road map, such as by utilizing a pre-existing low-resolution map as general structure to be expected in the top-down functional map. In some exemplary embodiments, using GPS location, a relevant segment in a low-resolution map may be obtained and provided together with the sensor information for real-time generation of the top-down functional map.

Yet another technical effect of utilizing the disclosed subject matter is to avoid having to maintain pre-existing HD maps. If pre-existing maps are relied upon, any change may need to be identified in order to modify the pre-existing mapping. An addition of a stop line, a change in the location of the cross-walk, and a removal of a road bump, or a similar change in the road, may need to be identified, and a modification of the HD map may be required. Using the disclosed subject matter, which does not rely on a pre-existing HD functional mapping, no maintenance of existing maps may be required.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 showing a schematic illustration of an exemplary neural network, in accordance with some exemplary embodiments of the disclosed subject matter.

In some exemplary embodiments, Artificial Neural Network 100 may be configured to process a Visual Input 110 to generate a functional top-down map. Artificial Neural Network 100 may be based on a collection of connected layers. Different layers may perform different transformations on their inputs. Signals may travel from the first layer (e.g., the layer directly receiving Visual Input 110), to the last layer (e.g., the layer providing Output 160). In some exemplary embodiments, the signals may traverse the layers multiple times.

In some exemplary embodiments, Artificial Neural Network 100 may be trained to detect road features and transform the front view of Visual Input 110 into a top view functional map in a single shot. Artificial Neural Network 100 may be configured to process Visual Input 110 and generate an Output 160 of top-down functional road map, providing features relevant to assisting the autonomous navigation of the vehicle within the map.

In some exemplary embodiments, Artificial Neural Network 100 may have an encoder-decoder architecture. The encoder-decoder architecture may comprise an internal layer that may describe a code used to represent the input (e.g., Latent Vector 140). In some exemplary embodiments, the encoder-decoder architecture may comprise two components: an Encoder 130 that maps the input into Latent Vector 140, and a Decoder 150 that maps Latent Vector 140 to a top-down functional road map. The encoder-decoder architecture may be configured encode all the necessary information that is required for generating the functional top-down map into Latent Vector 140. Such architecture may be configured force Artificial Neural Network 100 to distill the abundance of information available into only the parts most relevant to interpreting the scene into a top-down map. In some exemplary embodiments, the input of Encoder 130 may be of different size and shape than that of the output of Decoder 150 (e.g., 1024×1080×4 pixels as input, representing four different sensor modalities for each pixel in the visual input, and 64×64×6 nodes as output, representing 6 different functional modalities for each pixel in the top-down functional map).

In some exemplary embodiments, Encoder 130 may be configured to process Visual Input 110 and compress it into a single Latent Vector 140. In some exemplary embodiments, Encoder 130 may comprise one or more down-sampling residual blocks. In some exemplary embodiments, Encoder 130 may comprise no more than two down-sampling residual blocks utilized to remove information before encoding Visual Input 110 into Latent Vector 140. In some exemplary embodiments, Encoder 130 may comprise one or more encoding layers, such as one encoding layer, three encoding layers, ten encoding layers, or the like. In some exemplary embodiments, Encoder 130 may be absent a perspective transformation layer for changing an image of the scene from the front view to an alternative image of a top-down view. Instead, Encoder 130 may transform Visual Input 110 into Latent Vector 140 which may capture semantic information of Visual Input 110. Decoder 150 may then use Latent Vector 140 to provide the functional mapping of the scene from a different point of view (a top-down view instead of a front view).

Additionally or alternatively, Encoder 130 may comprise a Backbone 120 configured to transform Visual Input 110 into a Scaled Down Feature Layer 125 to be encoded. Backbone 120 may be configured to transform Visual Input 110 into Scaled Down Feature Layer 125. Encoder 130 may be configured to map Scaled Down Feature Layer 125 into Latent Vector 140. It may be noted that the existence and the size of Backbone 120 may depend on the size of Visual Input 110. Encoder 130 may employ Backbone 120 as an average pooling layer, before outputting Latent Vector 140. In some exemplary embodiments, Backbone 120 may be configured reduce the resolution of the Visual Input 110 until it is represented by scaled down feature maps in which the spatial structure of the scene is no longer discernible. In some exemplary embodiments, Backbone 120 may be a fully convolutional network, such as Dilated Residual Network (DRN) or variation thereof, EfficientNet™ network or variation thereof, or the like. Additionally or alternatively, Backbone 120 may comprise multiple convolutional network of different types. As an example, Backbone 120 may comprise 6 blocks of the DRN-26 network, which may comprise about 18 convolutional layers. Additional modifications or customizations may be performed on the utilized convolutional networks to obtain the desired features of Backbone 120. In one embodiment, Scaled Down Feature Layer 125 may be designed to comprise between 256 to 512 channels, with width and height of about ⅛ of the dimensions of Visual Input 110. Such loss of spatial acuity, that may limit image classification accuracy and scene understanding, may be alleviated by dilation, which increases the resolution of output feature maps without reducing the receptive field of individual neurons. Scaled Down Feature Layer 125 may be passed to Encoder 130 for being processed and compressed it into Latent Vector 140.

In some exemplary embodiments, Latent Vector 140 may be the final layer produced from Encoder 130. The content of Latent Vector 140 may encapsulate the information for all features of Visual Input 110 in order to enable Decoder 150 to make accurate decisions when generating Output 160.

In some exemplary embodiments, the size of Latent Vector 140 may be varied. However, the size may be unlikely to exceed 1024 nodes in the most extreme case. The size of Latent Vector 140 may be about 10 nodes, about 64 nodes, about 100 nodes, about 200 nodes, or the like.

In some exemplary embodiments, Latent Vector 140 may be passed through Decoder 150. Decoder 150 may be configured to expand Latent Vector 140 into a functional top-down map of the road ahead of the vehicle. Decoder 150 may comprise several decoding layers. It may be noted that Encoder 130 and Decoder 150 may comprise different number and different type of layers. Furthermore, the input of Encoder 130 may have a different size than the output of Decoder 150.

Additionally or alternatively, Artificial Neural Network 100 may comprise additional layers that may be configured to improve the quality of Output 160. As an example, Latent Vector 140 may be passed through a linear fully connected layer (not shown), before being passed through Decoder 150. The linear fully connected layer may comprise about 5 residual up-sampling blocks, which may incorporate spectral normalization layers atop the convolution modules, ending with a self-attention layer and a final residual block. The spectral normalization may be applied on Latent Vector 140 to stabilize the training of Artificial Neural Network 100. Additionally or alternatively, Artificial Neural Network 100 may comprise Exponential Linear Unit (ELU) activation layers to speed up the learning, Batch Normalization layers to stabilize the learning, Convolutional Block Attention Module (CBAM) layers for accuracy improvement of the learning, or the like. As yet another example, Artificial Neural Network 100 may employ coordinates-augmented convolutions, such as CoordConvs™, instead of regular convolutions.

It may be noted that Artificial Neural Network 100 does not perform a proper segmentation or categorization of each pixel in Visual Input 110 to be directly mapped by a pixel in Output 160. Neural Network 100 may encode Visual Input 110 into a completely different representation which is neither a segmented representation nor a geometric transformation of perspective, but is rather a specific symbolic representation, which may be utilized for navigation.

In some exemplary embodiments, Artificial Neural Network 100 may be trained using a training database that comprises sensor input and a functional top-down map that is manually provided. The pre-existing HD maps may be utilized to train Artificial Neural Network 100 together with a corresponding sensor input. Artificial Neural Network 100 may be trained to provide the correct top-down functional road map given front-view sensor information. As a result, Artificial Neural Network 100 may be trained to correctly encode Latent Vector 140 out of sensor information and decode such information into an accurate top-down functional road map to be utilized for autonomous driving. After such training is complete, Artificial Neural Network 100 may be configured to generate a top-down function road map based on a given sensor input.

Additionally or alternatively, training may utilize a top-down sensor view of the vehicle. The top-down sensor view may be provided using a drone accompanied the vehicle that is driving, using a sensor mounted on a poll above the vehicle, or the like. Using the top-down sensor view that can be translated into functional road map, Artificial Neural Network 100 may be trained to transform a front view sensor information to a top-view functional road map without the intermediate representation of the top-view sensor information.

In some exemplary embodiments, Artificial Neural Network 100 may be configured to receive a sequence of sensor information, such as to indicate information received over time (e.g., last 24 frames obtained from a camera).

Figure 2:
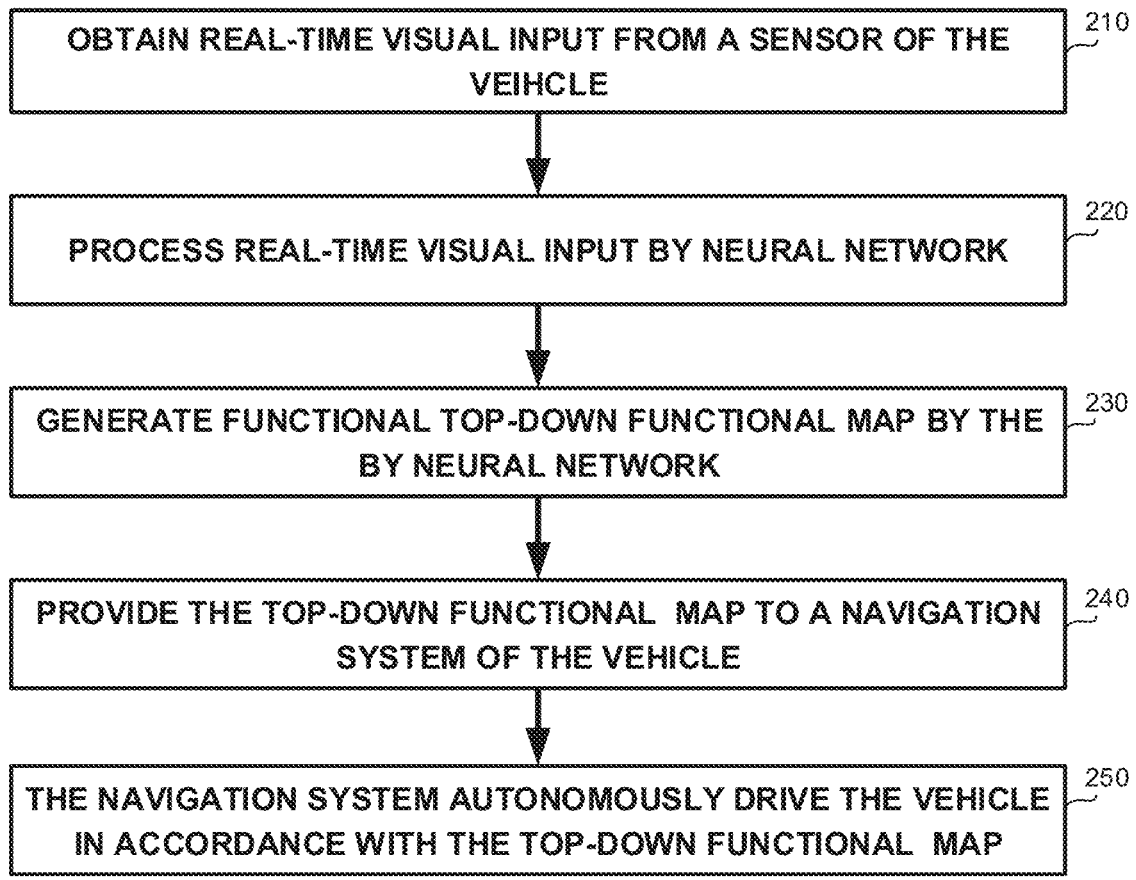
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 210, a real-time visual input may be obtained from one or more sensors mounted on a vehicle. In some exemplary embodiments, the real-time visual input may capture a front view of a road ahead of the vehicle. Additionally or alternatively, the real-time visual input further may capture a back view behind the vehicle, side views at a left side and at a right side of the vehicle, or the like. As an example, the real-time visual input may comprise three camera images, one capturing a forward view in front of the vehicle, the second capturing a left view and the third capturing a right view of the vehicle. Additionally or alternatively, the real-time visual input may comprise a plurality of images taken at fixed distance intervals. As an example, the real-time visual input may comprise a current image (e.g., from the current location of the vehicle), an image from 2 meters formerly, 4 meters formerly, or the like. In some exemplary embodiments, the distance between the images may be determined based on the vehicle's activity, such as in view of the number of wheels rotations, distance traveled, or the like.

On Step 220, the real-time visual input may be processed by a neural network, such as 100 of FIG. 1. The processing of the real-time visual input may be performed without relying on a pre-determined precise mapping. In some exemplary embodiments, the vehicle may comprise a location module providing location information of the vehicle, such as a GPS system, a satellite navigation system, or the like. Processing the real-time input may be performed without relying on the location information of the vehicle.

In some exemplary embodiments, the neural network may comprise an encoder-decoder architecture. The encoder-decoder architecture may comprise an encoder section, a latent vector layer, and a decoder section having one or more decoding layers. In some exemplary embodiments, the encoder section may be configured to receive as input the real-time visual input. The encoder section may comprise a fully convolutional network, having one or more encoding layers. The fully convolutional network may be configured to transform the real-time visual input into a scaled down feature layer. The encoder section may be configured to map the scaled down feature layer into the latent vector layer.

On Step 230, a functional top-down map of the road ahead of the vehicle may be generated. In some exemplary embodiments, the decoder section of the encoder-decoder architecture may be configured to output a functional top-down map of the scene represented by the real-time visual input. The decoder section may be configured to simultaneously transform the visual information provided in the real-time visual input to functional information and changing a point of view of the scene from a front view to a top-down view. It may be appreciated that the encoder section may be absent a perspective transformation layer for changing an image of the scene from the front view to an alternative image of a top-down view. It may also be noted that the input of the encoder section may have a different size, different shape, different number of nodes, or the like than an output of the decoder section.

In some exemplary embodiments, each pixel in the functional top-down map may be associated with a predetermined relative position to the vehicle. A content of each pixel in the functional top-down map may be assigned a set of values. Each value may be configured to represent a functional feature relating to a location at a corresponding predetermined relative position to the pixel. As an example, the functional features may be a drivable road indication, an available driving path indication, a stop line indication, a speed bump indication, a lane markings indication, or the like. The set of values assigned to each pixel in the functional top-down map may comprises at least two different functional features. The functional top-down map may provide functional information useful for an autonomous navigation system to perform autonomous driving.

On Step 240, the functional top-down map may be provided to an autonomous navigation system of the vehicle. In some exemplary embodiments, autonomous navigation system may be utilized by the vehicle to perform the autonomous driving, such as for finding directional, correlating positions on the road, adjusting the route, or the like.

On Step 250, the autonomous navigation system may autonomously drive the vehicle in accordance with functional features represented by the functional top-down map. In some exemplary embodiments, in addition to the functional top-down map, the autonomous navigation system may utilize additional information for driving, such as but not limited to object recognition for identifying objects in the street, such as a pedestrian or another vehicle, whose presence is not indicated in the functional top-down map.

Figure 3A:
FIG. 3A shows a schematic illustration of an exemplary visual input, in accordance with some exemplary embodiments of the disclosed subject matter.

Referring now to FIG. 3A showing a schematic illustration of an exemplary visual input, in accordance with some exemplary embodiments of the disclosed subject matter.

In some exemplary embodiments, Input Image 300 may be an image captured by a sensor mounted on a vehicle, such as a front-mounted camera. Input Image 300 may be a Red Green Blue (RGB) image. However, other types of images may be utilized as input images, to obtain Input Image 300 or the like. As an example, a thermal infra-red cameras may be utilized, in conjunction with the RGB input to obtain Input Image 300, may be utilized separately as a separate type of input, may be utilized as an additional layer of input, or the like.

Input Image 300 may capture a front view of a road ahead of the vehicle. Additionally or alternatively, other views may be captured, such as back view behind the vehicle, side views to the left and the right of the vehicle, or the like. In some exemplary embodiments, a top-down view of the vehicle may not be available.

In some exemplary embodiments, Input Image 300 may be part of a series of input images taken at fixed distance intervals, such as an image capturing the current location, an image capturing a location from a former 2 meters, an image capturing a location from a former 4 meters, or the like. Additionally or alternatively, Input Image 300 may be an aggregation or a combination of the series of input images.

Figure 3B:
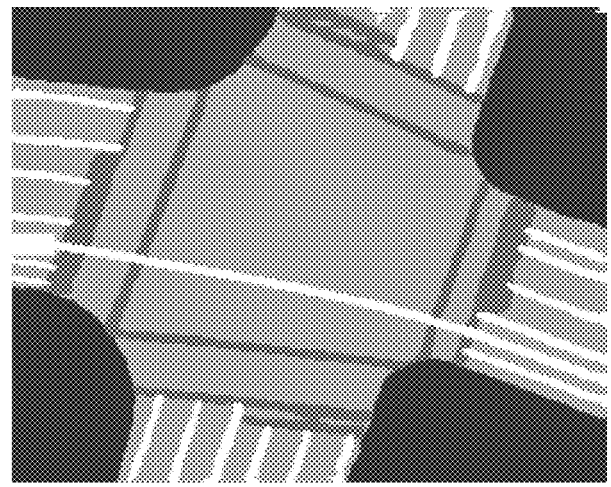
FIG. 3B shows a schematic illustration of an exemplary top-down functional map, in accordance with some exemplary embodiments of the disclosed subject matter.
Figure 3C:
FIGS. 3C-3I show schematic illustrations of exemplary map layers, in accordance with some exemplary embodiments of the disclosed subject matter.
Figure 3D:
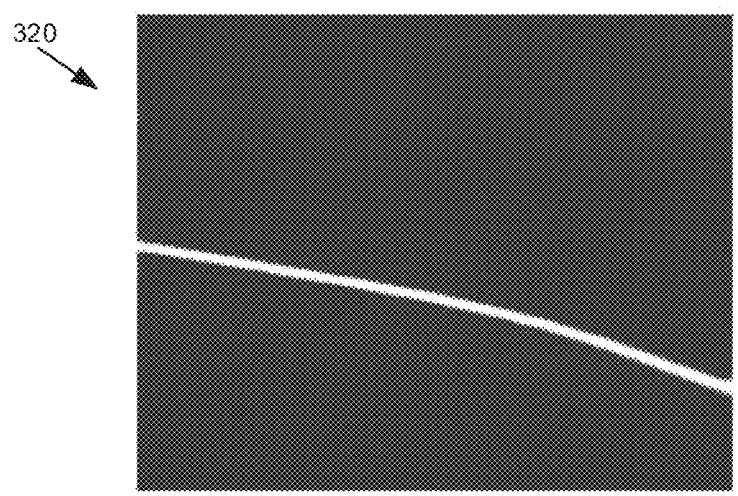
Figure 3E:
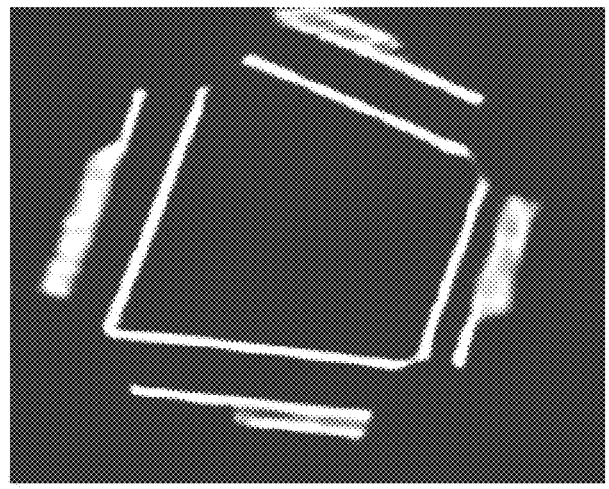
Figure 3F:
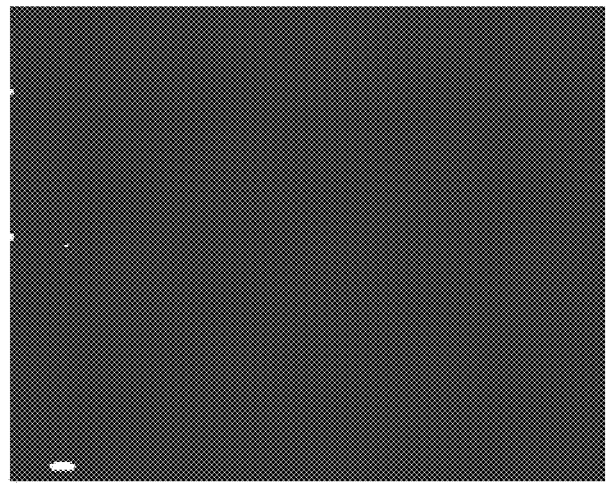
Figure 3G:
Figure 3H:
Figure 3I:
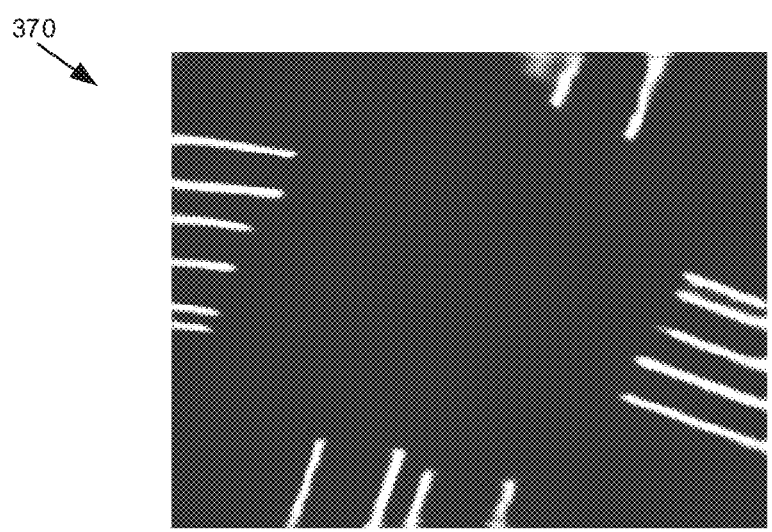

Referring now to FIG. 3B showing a schematic illustration of an exemplary top-down functional map, in accordance with some exemplary embodiments of the disclosed subject matter.

In some exemplary embodiments, Functional Top-Down Map 380 may be the output of a neural network, such as Artificial Neural Network 100 of FIG. 1, on Input Image 300.

In some exemplary embodiments, Functional Top-Down Map 380 may be comprised of several layers of identical dimensions, e.g., 310-370. Each layer may represent a functional feature of the road. As a result, Functional Top-Down Map 380 may be an (n×H×W) matrix. Parameter n may be the number of layers or categories comprised by Functional Top-Down Map 380 (e.g., Map Layers 310-370). The number of layers and their corresponding categories may differ from model to model. Parameters H and W may be the height and width of Functional Top-Down Map 380, which may be different than the height and width of Input Image 300.

In some exemplary embodiments, a content of each pixel in Functional Top-Down Map 380 may be assigned a set of values. The set of values may comprise n values, each of which belongs to a different layer. Each value may represent a functional feature relating to a location at a predetermined relative position to the pixel. As an example, the value of each pixel, in each layer, may be a confidence value (a number between 0 and 1) that the relevant functional feature exists within that pixel. The value of each pixel may be determined based on the set of values. The value of the pixel may be determined based on the confidence value being above a predetermined threshold, such as 0.5.

Referring now to FIGS. 3C-3I showing schematic illustrations of exemplary map layers, in accordance with some exemplary embodiments of the disclosed subject matter.

In some exemplary embodiments, each layer of Map Layers 310-370 of FIGS. 3C-3I correspond to a different functional feature. Map Layer 310 may represent drivable road indications within Input Image 300. Map Layer 320 may represent available driving path indications within Input Image 300. Map Layer 330 may represent stop line indications within Input Image 300. Map Layer 340 may represent indications of stop lines for traffic lights within Input Image 300. Map Layer 350 may represent speed bump indications within Input Image 300. Map Layer 360 may represent dashed lane markings indications within Input Image 300. Map Layer 370 may represent continuous lane markings indications within Input Image 300.

It may be noted that in some samples some of the layers may be empty. As an example, Map Layer 340 comprises a small indication of stop lines for traffic lights within Input Image 300, however, for other input images that do not comprise stop lines for traffic lights, the relevant map layer may be empty. Functional Top-Down Map 380 may be an aggregation of Map Layers 310-370.

Figure 4A:
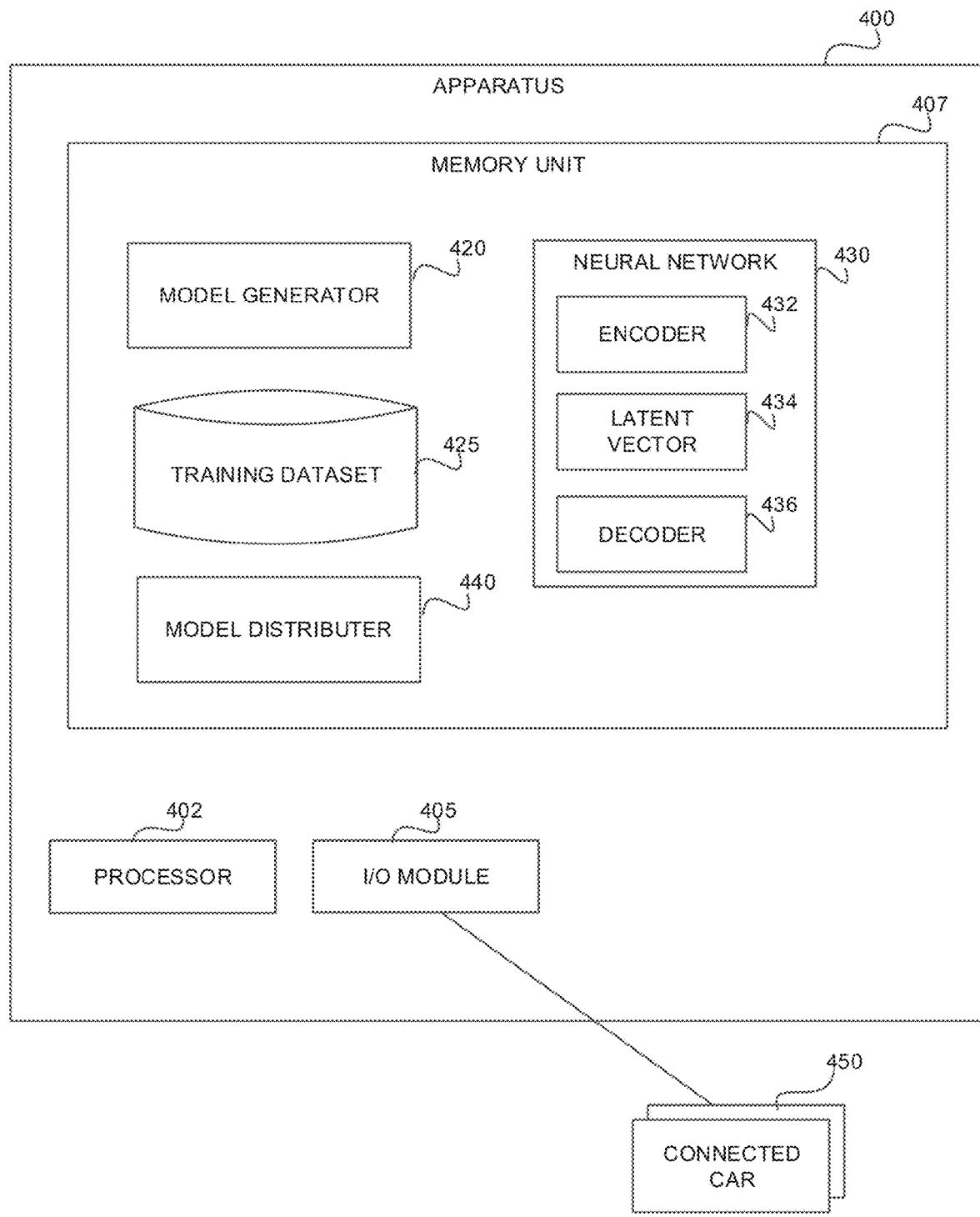
FIGS. 4A-4B show block diagrams of apparatuses, in accordance with some exemplary embodiments of the disclosed subject matter.

Referring now to FIG. 4A showing a block diagram of an apparatus, in accordance with some exemplary embodiments of the disclosed subject matter. An Apparatus 400 may be configured to support generation of models for generating top-down functional road maps for autonomous vehicles, in accordance with the disclosed subject matter.

In some exemplary embodiments, Apparatus 400 may comprise one or more Processor(s) 402. Processor 402 may be a Central Processing Unit (CPU), a microprocessor, an electronic circuit, an Integrated Circuit (IC) or the like. Processor 402 may be utilized to perform computations required by Apparatus 400 or any of it subcomponents.

In some exemplary embodiments of the disclosed subject matter, Apparatus 400 may comprise an Input/Output (I/O) module 405. I/O Module 405 may be utilized to provide an output to and receive input from a user, a device, a sensor, or the like, such as, for example receiving an input from one or more sensors of Connected Cars 450, providing output for one or systems of Connected Cars 450, or the like.

In some exemplary embodiments, Apparatus 400 may comprise Memory 407. Memory 407 may be a hard disk drive, a Flash disk, a Random Access Memory (RAM), a memory chip, or the like. In some exemplary embodiments, Memory 407 may retain program code operative to cause Processor 402 to perform acts associated with any of the subcomponents of Apparatus 400.

In some exemplary embodiments, Model Generator 425 may be configured to utilize data from Training Set 425 to train Neural Network 430 to generate top-down functional models.

In some exemplary embodiments, Neural Network 430 may comprise an encoder-decoder architecture. The encoder-decoder architecture may comprise an Encoder 430, a Latent Vector 432, and a Decoder 434. The input of Encoder 430 may be of a different size than an output of Decoder 434.

In some exemplary embodiments, Encoder 430 may comprise one or more decoding layers. Encoder 430 may be configured to receive as input the real-time visual input. Encoder 430 may comprise a fully convolutional network. The fully convolutional network may be configured to transform the real-time visual input into a scaled down feature layer. Encoder 430 may be absent a perspective transformation layer for changing an image of the scene from the front view to an alternative image of a top-down view. Encoder 430 may be configured to map the scaled down feature layer into Latent Vector 432. Latent Vector 432 may be of a scaled down size comparing to Neural Network 430. As an example, Latent Vector 432 may comprise less than about 1024 nodes, less than 512 nodes, less than 256 nodes, less than 128 nodes, or the like. Decoder 434 may be configured to output the functional top-down map. Decoder 434 may be configured to map Latent Vector 432 to a top-down functional map. However, the top-down functional map may be of a different shape and size than the input.

It may be noted that Decoder 434 may simultaneously transform visual information of the real-time visual input to functional information and changing a point of view of the scene from front, back or side view, to a top-down view. Such transformation may be inconsistent of the regular notion encoder-decoder architecture where the decoder maps the latent vector into a reconstruction of the input having the same shape as the input. On the other hand, Encoder 432 may not comprise a perspective transformation layer for changing an image of the scene from the front view to an alternative image of a top-down view.

In some exemplary embodiments, Neural Network 430 may be trained by Model Generator and provided to Connected Car 450 via I/O Module 405, to be utilized for generating the top-down functional map. Additionally or alternatively, a top-down functional map generated by Neural Network 430 may be provided to Connected Car 450 via I/O Module 405, to be utilized for navigation thereof.

Figure 4B:
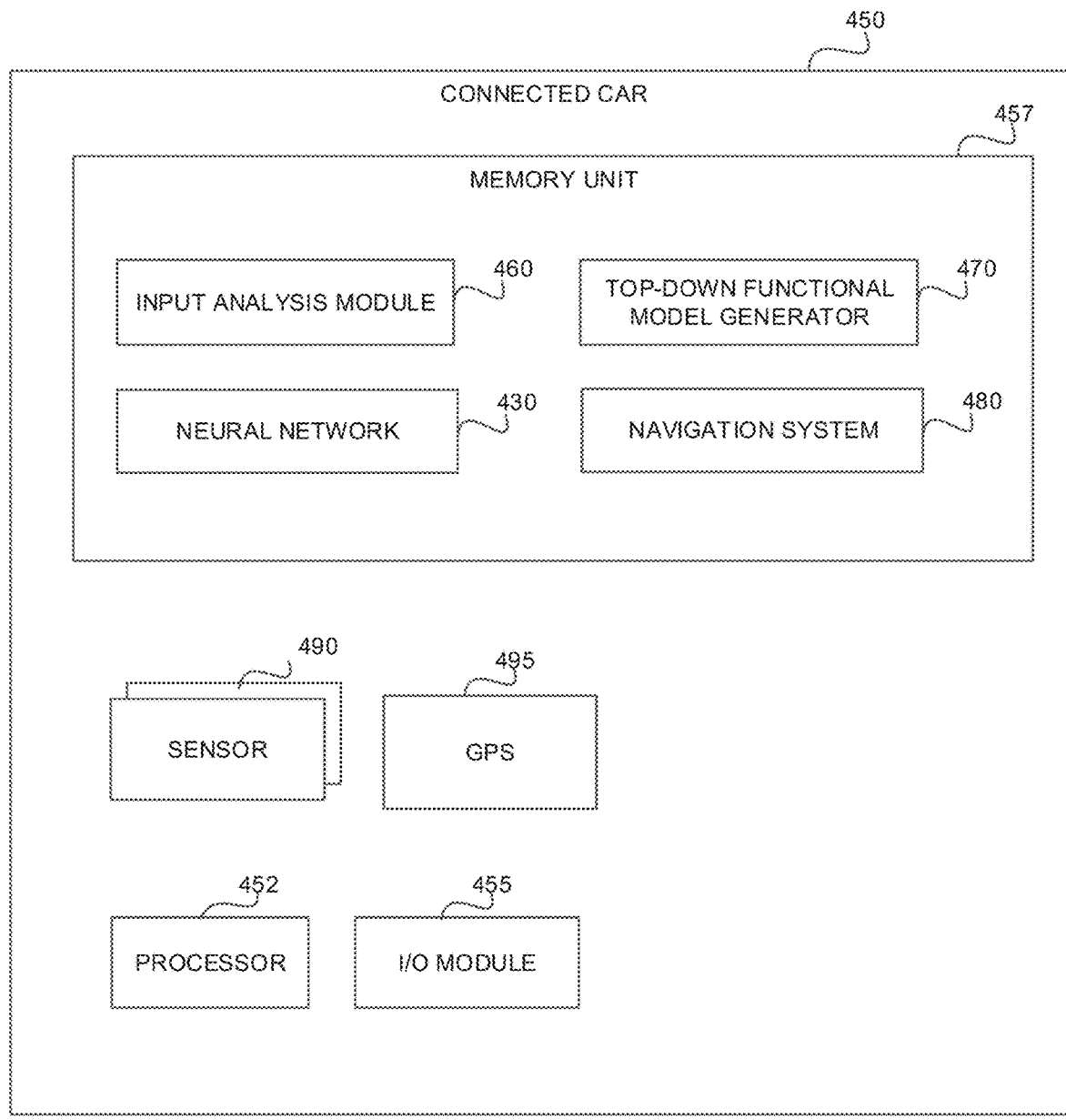

Referring now to FIG. 4B showing a block diagram of an apparatus, in accordance with some exemplary embodiments of the disclosed subject matter. An apparatus of Connected Car 450 may be configured to generate top-down functional models enable autonomous driving of a vehicle, in accordance with the disclosed subject matter.

In some exemplary embodiments, Connected Car 450 may comprise one or more Processor(s) 452. Processor 452 may be a Central Processing Unit (CPU), a microprocessor, an electronic circuit, an Integrated Circuit (IC) or the like. Processor 452 may be utilized to perform computations required by Connected Car 450 or any of it subcomponents.

In some exemplary embodiments of the disclosed subject matter, Connected Car 450 may comprise an Input/Output (I/O) module 455. I/O Module 455 may be utilized to provide an output to and receive input from a user or a sensor or other apparatus, such as, for example receiving an input from Apparatus 400, providing output for Apparatus 400, or the like.

In some exemplary embodiments, Connected Car 450 may comprise a Memory 457. Memory 457 may be a hard disk drive, a Flash disk, a Random Access Memory (RAM), a memory chip, or the like. In some exemplary embodiments, Memory 457 may retain program code operative to cause Processor 452 to perform acts associated with any of the subcomponents of Connected Car 450.

In some exemplary embodiments, one or more Sensor(s) 490 may be configured to collect real-time input associated with the vehicle of Connected Car 450. The real-time input may be a visual input, such as an image, a video, an RGB model, or the like. Sensor 490 may be a digital camera, a thermal infra-red camera, RGB modeling sensor, a LiDar, a combination thereof, or the like. The real-time visual input may capture a front view of a road ahead of the vehicle of Connected Car 450, a back view behind the vehicle of Connected Car 450, side views at a left side and at a right side of the vehicle of Connected Car 450, other scenes around the vehicle of Connected Car 450, or the like. Sensor 490 may be mounted on the vehicle of Connected Car 450, may be connected to another physical sensor mounted on the vehicle, or the like. Additionally or alternatively, Sensor 490 may comprise a plurality of sub-sensors, each of which may be mounted on a different portion of the vehicle. Sensor 490 may be a camera, a smart camera device, a network of spatially distributed smart camera devices, a sonographer, Magnetic resonance imaging (MRI) sensor, or any other sensor that can produce a visual input. Other kinds of input may be obtained and processed.

In some exemplary embodiments, Input Analysis Module 460 may be configured to analyse the real-time input obtained from Sensor 490. Input Analysis Module 460 may be configured to convert the real-time input into a visual input that can be processed by Neural Network 430, such as a visual front view representation of a scene.

In some exemplary embodiments, Connected Car 450 may comprise a GPS Module 495 configured to provide location information of the vehicle. However, Input Analysis Module 460 may analyze the real-time input without relying on a pre-determined precise mapping or location information of the vehicle that may be determined by GPS Module 495.

In some exemplary embodiments, Top-Down Functional Model Generator 470 may be configured to generate a functional top-down map of the road ahead of the vehicle of Connected Car 450. Each pixel in the generated functional top-down map may be associated with a predetermined relative position to the vehicle. A content of each pixel in the generated functional top-down map may be assigned a set of values, each of which represents a functional feature relating to a location at a corresponding predetermined relative position to the pixel.

In some exemplary embodiments, Top-Down Functional Model Generator 470 may utilize Neural Network 430, that may be configured to process the real-time input provided by Sensor 490 to generate the functional top-down map. Additionally or alternatively, Top-Down Functional Model Generator 470 may obtain the input from Input Analysis Module 460. It may be appreciated that Top-Down Functional Model Generator 470 may generate the functional top-down map without relying on a pre-determined precise mapping or other information obtained using GPS Module 495.

In some exemplary embodiments, the functional top-down map may be configured to provide functional information useful for Navigation System 480 to perform autonomous driving of the vehicle of Connected Car 450. Navigation System 490 may autonomously drive the vehicle in accordance with functional features represented by the generated functional top-down map.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining a real-time data from multiple sensors mounted on a vehicle providing a plurality of views from the vehicle, including at least a front view of a road ahead of the vehicle;
   processing the real-time data using a neural network to generate a functional map of the road ahead of the vehicle, wherein the functional map is provided in a view that is different from at least one of the plurality of views from the vehicle, wherein each pixel in the functional map is associated with a predetermined relative position to the vehicle, wherein a content of each pixel in the functional map is assigned a set of values, each of which represents a functional feature relating to a location at a corresponding predetermined relative position to the pixel, wherein said processing is performed without relying on a pre-determined precise mapping; and
   providing the functional map to an autonomous navigation system of the vehicle, whereby the autonomous navigation system autonomously drives the vehicle in accordance with functional features represented by the functional map.

2. The method of claim 1, wherein the functional map represents an elevated view with respect to the vehicle, wherein the elevated view captures a top-down view of the road ahead of the vehicle from a different point of view of the real-time data.

3. The method of claim 1, wherein the real-time data comprises a visual input from capturing at least a front view, a back view and two side views, wherein the multiple sensors mounted on the vehicle comprise multiple cameras.

4. The method of claim 1, wherein the multiple sensors comprise at least four visual sensors configured to capture at least the front view, a back view behind the vehicle, and two side views at a left side and at a right side of the vehicle.

5. The method of claim 4, wherein the real-time data comprises a series of images taken at different times.

6. The method of claim 1, wherein the functional map comprises a functional element representing a second vehicle appearing in the real-time data, wherein a vector space associated with the functional element represents at least two of:
   a position of the second vehicle relative to the vehicle;
   an orientation of the second vehicle; and
   a relative velocity of the second vehicle.

7. The method of claim 1, wherein the functional map depicts at least a following set of functional features:
   a road;
   lane markings;
   speed bumps; and
   stop lines;
   whereby the functional map providing functional information useful for the autonomous navigation system to perform autonomous driving.

8. The method of claim 1, wherein the functional map provides a bird's-eye view from above the vehicle, whereby providing a top-down perspective of the road ahead of the vehicle based on the front view of the road ahead of the vehicle.

9. A computerized apparatus having a processor, the processor being adapted to perform the steps of:
   obtaining a real-time data from multiple sensors mounted on a vehicle providing a plurality of views from the vehicle, including at least a front view of a road ahead of the vehicle;
   processing the real-time data using a neural network to generate a functional map of the road ahead of the vehicle, wherein the functional map is provided in a view that is different from at least one of the plurality of views from the vehicle, wherein each pixel in the functional map is associated with a predetermined relative position to the vehicle, wherein a content of each pixel in the functional map is assigned a set of values, each of which represents a functional feature relating to a location at a corresponding predetermined relative position to the pixel, wherein said processing is performed without relying on a pre-determined precise mapping; and
   providing the functional map to an autonomous navigation system of the vehicle, whereby the autonomous navigation system autonomously drives the vehicle in accordance with functional features represented by the functional map.

10. A computer program product comprising a non-transitory computer readable storage medium retaining program instruction, which program instructions when read by a processor, cause the processor to perform a method comprising:
    obtaining a real-time data from multiple sensors mounted on a vehicle providing a plurality of views from the vehicle, including at least a front view of a road ahead of the vehicle;
    processing the real-time data using a neural network to generate a functional map of the road ahead of the vehicle, wherein the functional map is provided in a view that is different from at least one of the plurality of views from the vehicle, wherein each pixel in the functional map is associated with a predetermined relative position to the vehicle, wherein a content of each pixel in the functional map is assigned a set of values, each of which represents a functional feature relating to a location at a corresponding predetermined relative position to the pixel, wherein said processing is performed without relying on a pre-determined precise mapping; and providing the functional map to an autonomous navigation system of the vehicle, whereby the autonomous navigation system autonomously drives the vehicle in accordance with functional features represented by the functional map.

\* \* \* \* \*